United States Patent
Bolz

(10) Patent No.: US 7,218,497 B2
(45) Date of Patent: May 15, 2007

(54) PROTECTIVE CIRCUIT FOR PROTECTION AGAINST OVER-VOLTAGE FOR A CAN BUS TRANSCEIVER

(75) Inventor: Stephan Bolz, Pfatter (DE)

(73) Assignee: Siemens Aktiengesellschaft, München (DE)

( * ) Notice: Subject to any disclaimer, the term of this patent is extended or adjusted under 35 U.S.C. 154(b) by 177 days.

(21) Appl. No.: 10/533,757

(22) PCT Filed: Oct. 9, 2003

(86) PCT No.: PCT/DE03/03348

§ 371 (c)(1),
(2), (4) Date: May 4, 2005

(87) PCT Pub. No.: WO2004/042950

PCT Pub. Date: May 21, 2004

(65) Prior Publication Data
US 2006/0109601 A1  May 25, 2006

(30) Foreign Application Priority Data
Nov. 5, 2002  (DE) ............................. 102 51 473

(51) Int. Cl.
 H02H 9/06 (2006.01)
 H02G 3/00 (2006.01)

(52) U.S. Cl. .................... 361/119; 307/10.1
(58) Field of Classification Search ............ 361/119; 307/10.1
See application file for complete search history.

(56) References Cited

U.S. PATENT DOCUMENTS

| 5,559,448 | A  | * | 9/1996 | Koenig ................... 326/30 |
| 6,583,519 | B2 | * | 6/2003 | Aberle et al. ............ 307/10.1 |
| 6,639,389 | B2 | * | 10/2003 | Binder et al. .............. 323/266 |
| 6,838,943 | B2 | * | 1/2005 | Zamir et al. ............... 330/304 |
| 7,034,787 | B2 | * | 4/2006 | Date et al. .................. 345/89 |
| 7,130,175 | B2 | * | 10/2006 | Dietz et al. ................ 361/111 |

FOREIGN PATENT DOCUMENTS

| DE | 43 27 035 A1 | 2/1995 |
| DE | 197 33 250 A1 | 2/1999 |
| DE | 199 44 833 A1 | 3/2001 |
| DE | 101 02 243 A1 | 10/2002 |
| EP | 0 351 756 A1 | 1/1990 |
| EP | 0 895 438 A2 | 2/1999 |

* cited by examiner

*Primary Examiner*—Brian Sircus
*Assistant Examiner*—Boris Benenson
(74) *Attorney, Agent, or Firm*—Laurence A. Greenberg; Werner H. Stemer; Ralph E. Locher

(57) ABSTRACT

The invention relates to a protective circuit for a CAN-bus transceiver that is designed voltagewise for a first vehicle electric system, said transceiver being operated in a second vehicle electric system with a voltage that is several times higher than the voltage of the first vehicle electric system, comprising two diodes arranged between the bus terminal leads of the transceivers whose cathodes are connected to one another and to which a predetermined potential is applied, in addition to a limiting resistor mounted between each of the bus terminal leads of the transceiver and the bus line assigned thereto and two current mirror circuits for maintaining the require voltage level in the bus lines.

7 Claims, 2 Drawing Sheets

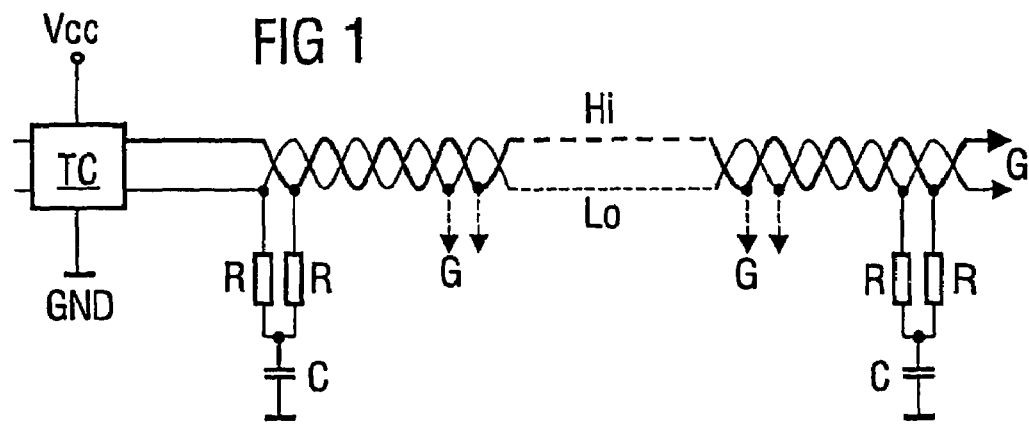
FIG 1
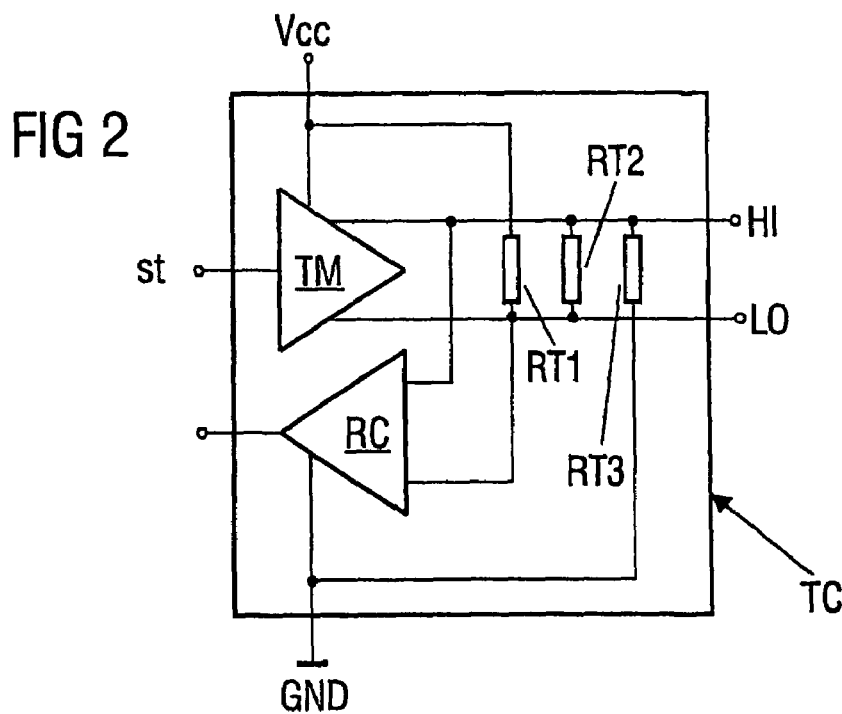
FIG 2
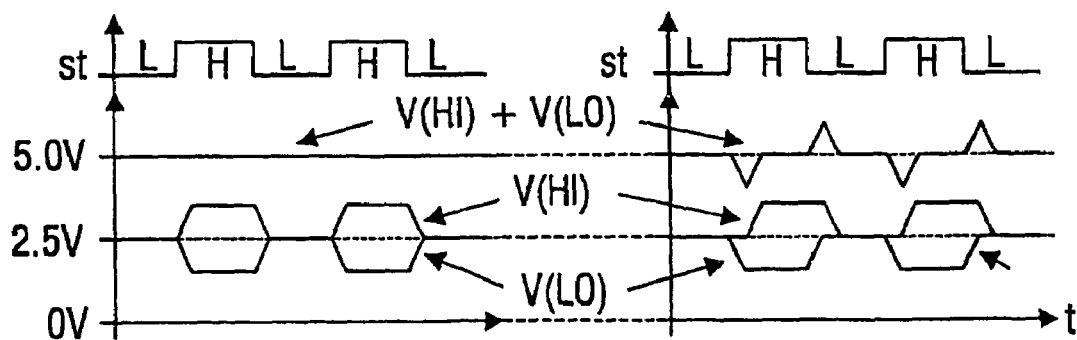
FIG 3A
FIG 3B

PROTECTIVE CIRCUIT FOR PROTECTION AGAINST OVER-VOLTAGE FOR A CAN BUS TRANSCEIVER

BACKGROUND OF THE INVENTION

Field of the Invention

The invention relates to a protective circuit for protection against over-voltage for a CAN bus transceiver designed in voltage terms for a first vehicle electrical system, said transceiver being operated in a second vehicle electrical system, in particular in a motorized vehicle electrical system, having a voltage several times that of the first vehicle electrical system either alone or in a two-voltage vehicle electrical system with the first and the second vehicle electrical system.

The introduction of motorized vehicle electrical systems having voltages of 14V+42V or, as the case may be, only 42V has been the subject of discussion for some time and is now imminent. The greatest obstacle to employing the electronic components used in the 14V vehicle electrical system in the 42V vehicle electrical system is the lack of short-circuit strength of said electronic components in association with 42V.

Whereas a short-circuit strength in the presence of 14–18V (permanently) and in the presence of 32–36V (transiently) has previously been adequate in the 14V vehicle electrical system (Vbat1=12V), a short-circuit strength of 58V (permanently) and of up to 70V (transiently) is required in the 42V vehicle electrical system (Vbat2=36V).

Existing ASIC circuits having been optimized also in terms of dielectric strength for the 14V vehicle electrical system, their direct use in the 42V vehicle electrical system is for the most part not possible. That can as a rule only be achieved by using another, dielectrically stronger semiconductor technology.

A change of technology of said type is as a rule tantamount to a redesign of the respective ASIC circuit, with the concomitant cost thereof amounting to millions and with a development period of several years.

Alternative approaches are necessary in order to provide pilot series production models for the 42V vehicle electrical system with suitable electronic components. It is possible, in particular for input and output functions having low driver power, to find protective circuits that will perform splitting in the event of short-circuiting to 42V vehicle electrical system voltages. If said protective circuits are structured discretely, the result together with the original functional modules will be assemblies that are 42V-compatible.

Extensive investigations indicate an urgent need for 42V-compatible communication interfaces. This applies particularly to the CAN bus transceiver, CAN having become the standard in automobile applications and now being employed in virtually every engine management and transmission control system.

A successful discrete circuit design can also serve as a basis for subsequent integration.

A circuit arrangement for a network terminating unit for coupling and decoupling useful signals and feeding terminating equipment at four-wire interfaces in digitally controlled communication networks is known from DE 197 33 250 A1, the feed circuit therein being protected against brief overcurrent by current-limiting means or, as the case may be, against continuous overcurrent by means of a feed deactivator having a time-controlled feed activator, and said circuit arrangement having an active line driver for achieving the necessary transmission level on the lines.

Disclosed in DE 43 27 035 A1 is an arrangement for the bi-directional transmission of data on a two-wire BUS system, which arrangement operates in the single-wire mode in the presence of a multiplicity of line faults, thereby preventing power losses also in the event of short-circuiting to a high operating voltage.

SUMMARY OF THE INVENTION

The object of the invention is to provide a protective circuit that is suitable for the CAN bus transceiver, technically easy to implement, and capable of being integrated, and which will enable a transceiver designed for the 14V vehicle electrical system to be used also in the 42V vehicle electrical system.

Said object is achieved according to the invention by means of a protective circuit having the features of claim 1.

Advantageous developments of the invention are indicated in the sub-claims.

The invention encompasses the technical principle of inserting a current-limiting resistor into each of the two lines of the CAN bus for the purpose of limiting the short-circuit currents and restoring the transmitter's then reduced driver power, taking specific EMC factors (common mode signal) into consideration, by means of an additional circuit that will be deactivated in the event of short-circuiting to 42V (self-protection).

An exemplary embodiment according to the invention is explained in more detail below with reference to a schematic drawing.

BRIEF DESCRIPTION OF THE DRAWING

FIG. 1 is a general diagram of a known CAN bus with a transceiver,

FIG. 2 is a block diagram of a CAN bus transceiver,

FIG. 3a shows the ideal signals on the lines of the CAN bus,

FIG. 3b shows the real signals on the lines of the CAN bus, and

DESCRIPTION OF THE PREFERRED EMBODIMENTS

Figure 4:
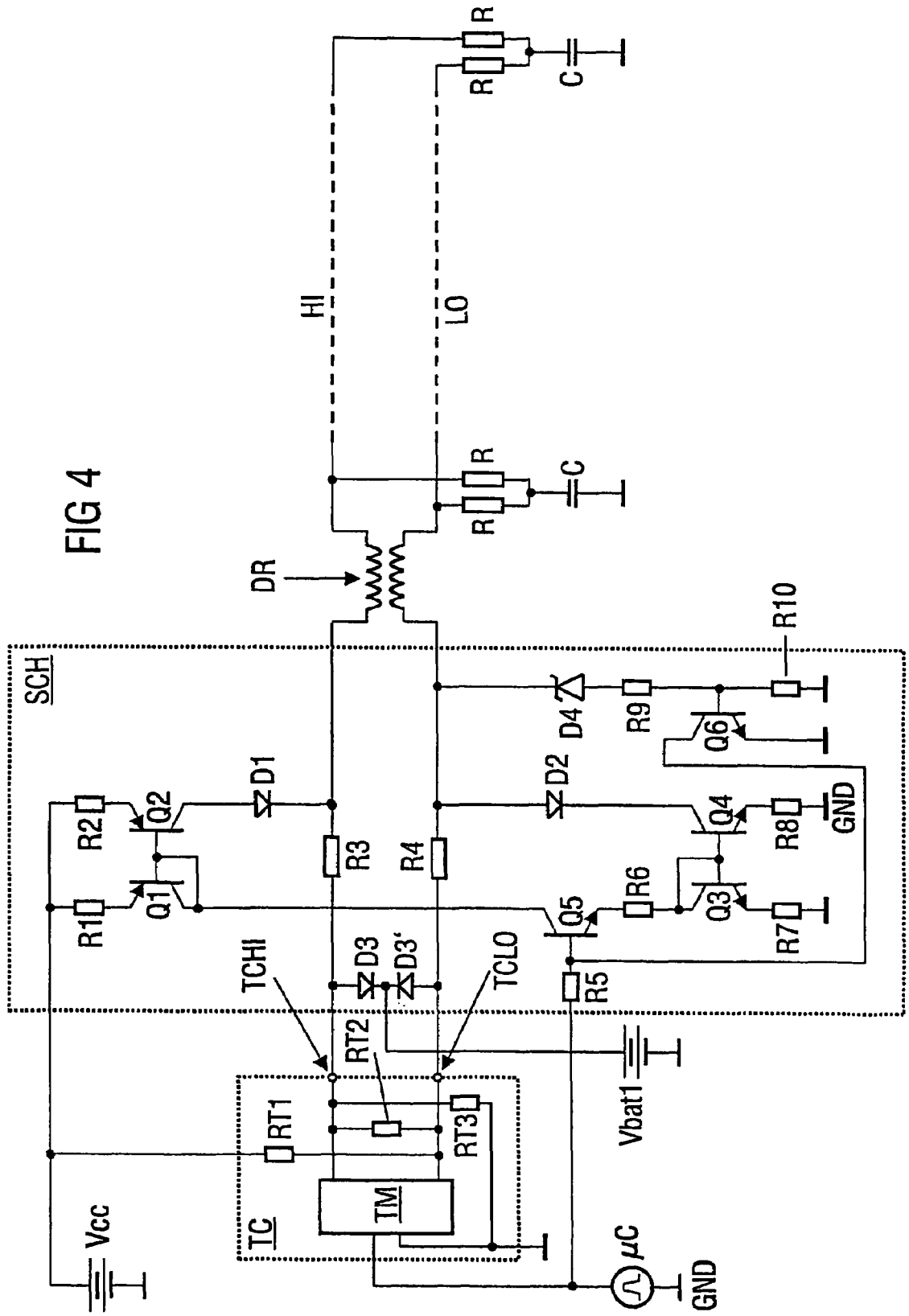
FIG. 4 is a diagram of the protective circuit according to the invention.

FIG. 1 is a general diagram of a known version of the CAN bus for differential data transmission in a 14V vehicle electrical system, said bus having a first bus line (HI) and a second bus line (LO) generally embodied as a twisted pair. The HI line is highlighted in bold in FIG. 1. At one end of the CAN bus line is a transceiver TC that communicates with a control device (microcomputer, controller etc.); connected to the other end is a device G which is to be driven via the CAN bus and which is itself connected to the CAN bus via a transceiver (not shown). Further devices G (and transceivers) can be connected at any point in the CAN bus. Each transceiver of a further device G requires a protective circuit according to the invention against short-circuits in the 42V vehicle electrical system.

A Philips PCA82C250 whose data is contained in the data sheet "Philips semiconductors PCA82C250 CAN controller interface, product specification" dated Jan. 13, 2000, is used, for instance, as the transceiver TC for a high-speed version.

The line impedance is 120Ω, for example; the CAN bus is accordingly terminated on each side by two resistors R (each rated 60Ω) connected in series between the lines HI and LO and by a grounded capacitor C (rated 100 nF) situated therebetween. The thus obtained low-level impedance to ground helps in suppressing (EMC) common mode signals.

FIG. 2 is a block diagram of a CAN bus transceiver TC. It comprises a transmitter TM (transmitter module) and a receiver RC (receiver module). A high-level resistor network for setting the direct voltage operating point is also integrated.

Said resistor network consists, for instance, of a resistor RT1 connected between the positive terminal Vcc of the supply voltage of the transceiver TC and the LO line of the CAN bus, a resistor RT2 connected between the HI and LO line, and a resistor RT3 connected between the HI line and ground GND. This is a possible circuit for generating a direct voltage level of 2.5V. RT1 and RT3 here have the same, high-resistance value (for example 100 kΩ each), while RT2 has a lower resistance (for example 5 kΩ). Through this arrangement the voltage on the HI line is slightly less than on the LO line, that situation being highly desirable. With this circuit dimensioning the differential input impedance measurable on the transceiver terminals TCHI and TCLO is approximately 5 kΩ.

A somewhat more detailed diagram of the transceiver TC can be seen in the block diagram in FIG. 1 of the already mentioned Philips data sheet of the PCAS2C250 CAN controller interface.

As shown in FIG. 3a, two level statuses can be generated on the bus lines HI and LO:

a) both lines are applied to a direct voltage potential V(HI)=V(LO)=+2.5V. This status corresponds to the "recessive" L level of the control signal st;

b) a direct voltage potential V(HI)=3.5V (2.5V+1V) is applied to the line HI and a direct voltage potential V(LO)=1.5V (2.5V−1V) is applied to the line LO. This status corresponds to the "dominant" H level of the control signal st.

The purpose of this is to ensure that the total voltage V(HI)+V(LO)=5V of both lines is constant at all times, thereby minimizing the occurrence of high-frequency noise radiation (EMC).

As the additional potentials (±1V) are not activated and deactivated at exactly the same time in known transceiver embodiments, voltage peaks (what are termed "spikes") occur in the summation signal during switching which give rise to undesired, high-frequency interference signal radiation, see FIG. 3b. This effect is counteracted by inserting a CAN bus choke DR between the transceiver TC and the lines HI and LO of the CAN bus, see FIG. 4.

Said choke DR acts like a transformer balancing out the differences in the signal curves between the lines so that the signal shapes can be made to approach the ideal. This minimizes the "spikes" and reduces the EMC noise radiation.

The transmitter TM is protected against short-circuiting both to ground (0V), to negative voltages (ground displacements, negative transient voltages), and to battery voltage Vbat1 (to 14–18V permanently and to 32–36V transiently). This measure is, however, ineffectual in the case of short-circuiting to 42V because the breakdown voltage of the transistors and protective diodes is far exceeded. The result in this case is excessive current flow and destructive overheating of the ASIC circuit.

The same protective measures apply to the receiver RC as to the transmitter.

The fatal effect in the case of short-circuiting in the 42V vehicle electrical system (58V permanently and up to 70V transiently) is due to the high value of the voltage and the resulting currents. A protective circuit ought not to restrict the transceiver's functioning in any way, but on the other hand it ought reliably to keep harmful voltage levels away from the transceiver terminals.

FIG. 4 shows a circuit according to the invention by means of which a transceiver TC that is designed for a 14V vehicle electrical system Vbat1 and which is operated in a two-voltage vehicle electrical system Vbat1+Vbat2 is reliably protected against short-circuiting in the 42V vehicle electrical system (~60V permanently and ~70V transiently). This is achieved by fixing the voltages on the transceiver terminals TCHI, TCLO to the battery voltage Vbat1 (+14V) and by limiting the fault current via limiting resistors inserted into the bus lines, which resistors must be dimensioned in such a way (each 1 kΩ/1 W, for example) that the receiver function of the transceiver TC is not impaired.

The transmitter then, however, being decoupled from the CAN bus by said limiting resistors, operation requires an additional circuit that will ensure the direct voltage level of 2.5V is maintained on the bus lines but which itself needs to be protected against short-circuiting in the 42V vehicle electrical system (60/70V).

Shown in FIG. 4 is the CAN bus as in FIG. 1. The transceiver TC is located at one end of the CAN bus (although only said transceiver's transmitter TM is shown here); the CAN bus lines HI and LO, highlighted by dashed lines, are again terminated on both sides by the two resistors R connected in series between the lines HI and LO and by the grounded capacitor C therebetween. For the sake of clarity the lines are not shown twisted; nor are the devices and transceivers requiring to be connected indicated, although the already mentioned choke DR between the transceiver TC and the CAN bus lines is shown.

A drive source μC (microcomputer, controller etc.) supplies the control signal st for the transmitting operation of the transceiver TC. The limiting resistors R3 and R4 are inserted as series resistors between the outputs of the transceiver TC and the bus lines HI and LO. Located between the two bus terminals (HI and LO) of the transceiver TC are two diodes D3 and D3' whose cathodes are connected to each other and to a predefined potential, for example to that of the first vehicle electrical system voltage Vbat1 (+12V) whose negative terminal is applied to ground GND.

If there is only one 42V vehicle electrical system Vbat2, the cathodes of the two diodes D3 and D3' can be applied to an existing potential or to a suitably dimensioned Zener diode. The value of the predefined potential P or, as the case may be, the value of the breakdown voltage Vz of the Zener diode can be within a range between the supply voltage Vcc of the transceiver TC and the vehicle electrical system voltage for which the transceiver TC is designed (in this case Vbat1).

The transceiver terminals TCHI, TCLO having been decoupled from the CAN bus via the resistors R3 and R4, the transceiver is no longer able to generate the necessary voltage levels V(HI)=3.5V and V(LO)=1.5V on the bus lines HI, LO.

For this reason two current-mirror circuits Q1-Q2 and Q3-Q4 are provided which perform this function. To generate the reference current for the first current-mirror circuit (Q1-Q2) and second current-mirror circuit (Q3-Q4), a resistor (R6) and a third transistor (Q5) are inserted between the transistors (Q1 and Q3) of the two current-mirror circuits (Q1-Q2, Q3-Q4), which transistors are arranged in series between the positive terminal (+Vcc) of the supply voltage (Vcc) of the transceiver (TC) and ground (GND).

Transistor Q2, which together with the transistor Q1 forms the first current-mirror circuit, is connected to the positive terminal +Vcc of the supply voltage via a resistor R2 and to the bus line HI via a diode D1 (in the conducting direction toward the bus line HI; as protection against reverse voltage).

Transistor Q4, which together with the transistor Q3 forms the second current-mirror circuit, is connected to ground GND via a resistor R8 and to the bus line LO via a diode D2 (in the conducting direction away from the bus line LO; as protection against reverse voltage).

Both current-mirror circuits must be designed for an output current of this type in such a way that when driven by the transceiver TC they will be able to generate the necessary voltage excursion on the CAN bus of +1V on the line HI and of −1V on the line LO (=2V peak-to-peak).

Both current-mirror circuits Q1-Q2, Q3-Q4 are activated and deactivated synchronously with the control signal st of the transceiver TC via the third transistor Q5.

A series arrangement comprising a Zener diode D4 and two resistors R9 and R10 is located between the bus line LO and ground GND. The connection point of the two resistors is connected to the base of a transistor Q6 whose emitter is applied to ground GND and whose collector is connected to the base of the third transistor Q5. The two current-mirror circuits Q1Q2, Q3-Q4 will be deactivated by said circuit arrangement as soon as the voltage on one of the CAN bus lines exceeds a value of, for example, the voltage (+12V) of the first vehicle electrical system Vbat1.

The corresponding diode D3, D3' will become conductive if short-circuiting occurs on one of the CAN bus lines in the 42V vehicle electrical system (up to 60/70V on the HI or LO line). The current will be limited by the limiting resistors R3, R4 to, for example, 30 mA, which is why they must be designed for a higher power level, for example 1 kΩ/1 W, as already mentioned. The transceiver outputs will be limited through this measure to a voltage Vbat1+0.7V increased by the voltage drop on the diode D3, D3'. The transceiver is internally protected against a voltage of this type.

The transceiver TC remains de-energized while data is being received and in the recessive phase; in the dominant phase the current will be limited to approximately 40 mA.

The current-mirror circuits Q1-Q2 and Q3-Q4 are protected by means of the two diodes D1, D2 against both polarity reversal and short-circuiting in the 42V vehicle electrical system on one of the CAN bus lines. Both current-mirror circuits are additionally protected by the transistor Q6, which will deactivate the two current-mirror circuits as soon as the voltage on one of the CAN bus lines exceeds a value of, for example, 12V.

The receiver function of the transceiver TC, which is to say when the transceiver of a device G (FIG. 1) transmits to the receiver of the transceiver TC, will not be impaired by the described measures. If the least favorable value (5 kΩ) is assumed for the differential input resistance, then the result, together with the limiting resistors R3, R4, will be a voltage divider which, although attenuating the bus signal toward the receiver (from ±1V to approximately ±0.7V), will nevertheless deliver a value conforming to the specifications of the PCA82C250 transceiver for instance employed.

The result for the transceiver protected in the described manner is as follows:

The protective circuit will reliably protect the transceiver against short-circuiting (permanently at least up to 60V and transiently 70V) on the bus lines, the protective circuit will be intrinsically safe and easy to implement using standard components;

the protective circuit's design concept will be suitable for integrating in an ASIC circuit; compliance will be ensured with the relevant specification parameters of the transceiver (for example of the PCA82C250 and CAN bus).

The output signals of the transmitter TM modified according to the invention are very symmetric so that it will probably be possible to dispense with the CAN bus choke DR without exceeding the radiated noise limits. This means a further cost saving.

The time up until when a fully integrated solution is available can be bridged using the protective circuit according to the invention.

The invention claimed is:

1. A protective circuit for protecting a CAN bus transceiver against overvoltage, wherein the CAN bus transceiver is configured, in voltage terms, for a first vehicle electrical system, and the CAN bus transceiver is operated in a second vehicle electrical system having a voltage multiple times a voltage of the first vehicle electrical system either alone or in a two-voltage vehicle electrical system with the first vehicle electrical system and the second vehicle electrical system, the CAN bus transceiver having two bus terminals for connection to respective bus lines and a supply voltage source of the transceiver with a positive terminal and a negative terminal, the protective circuit comprising:
   two diodes connected between the bus terminals of the transceiver, said diodes having cathodes connected to one another and to a predefined potential;
   a limiting resistor connected between each bus terminal of the transceiver and the bus line assigned thereto; and
   a first current-mirror circuit connected between the positive terminal of said supply voltage source of the transceiver and the first bus line, and a second current-mirror circuit connected between the second bus line and ground, for restoring voltage levels reduced by said limiting resistors on the bus lines.

2. The protective circuit according to claim 1, wherein a value of the predefined potential is within a range between the supply voltage of the transceiver and the vehicle electrical system voltage for which the transceiver is configured.

3. The protective circuit according to claim 1, wherein the predefined potential corresponds to a breakdown voltage of a Zener diode having a value within a range between the supply voltage of the transceiver and the vehicle electrical system voltage for which the transceiver is configured.

4. The protective circuit according to claim 1, which comprises, for generating a reference current for said first current-mirror circuit and said second current-mirror circuit, a resistor and a third transistor inserted between transistors of said first and second current-mirror circuits, wherein said transistors are connected in series between the positive terminal of said supply voltage source and ground.

5. The protective circuit according to claim 4, wherein said current-mirror circuits are selectively activated and deactivated via said third transistor by way of a control signal controlling a transmitting operation of the transceiver.

6. The protective circuit according to claim 1, which comprises a series circuit including a Zener diode and two resistors connected between one bus line and ground, a further transistor having a base connected to a node between said resistors, an emitter connected to ground, and a collector connected to a base of said third transistor, wherein said two current-mirror circuits are deactivated when a voltage on one of the CAN bus lines exceeds a specific value determined by way of said series circuit of said Zener diode and said two resistors.

7. In combination with a device having a plurality of CAN bus transceivers connected to a CAN bus, a plurality of protective circuits according to claim 1 each assigned and connected to a respective CAN bus transceiver for overvoltage protection.

* * * * *